United States Patent [19]
Clere et al.

[11] Patent Number: 5,017,217
[45] Date of Patent: May 21, 1991

[54] CERAMIC/METAL OR CERAMIC/CERAMIC COMPOSITE ARTICLE

[75] Inventors: Thomas M. Clere, Willowick, Ohio; Gholamreza J. Abbaschian, Gainesville, Fla.; Douglas J. Wheeler, Cleveland Heights; Albert L. Barnes, Wickliffe, both of Ohio

[73] Assignee: Eltech Systems Corporation, Boca Raton, Fla.

[21] Appl. No.: 557,425

[22] Filed: Aug. 21, 1990

Related U.S. Application Data

[60] Division of Ser. No. 945,116, Jan. 6, 1987, Pat. No. 4,961,902, which is a continuation-in-part of Ser. No. 825,402, Feb. 3, 1986, abandoned.

[51] Int. Cl.$^5$ .............................................. B22F 1/00
[52] U.S. Cl. ........................................ 75/244; 419/10; 419/23; 419/31; 419/38; 419/45; 419/48; 419/54; 419/60; 419/2; 501/96
[58] Field of Search ..................... 75/244; 419/10, 12, 419/23, 31, 38, 45, 48, 54, 60; 501/96

[56] References Cited

U.S. PATENT DOCUMENTS

| 2,084,349 | 6/1937 | Laise | 419/45 |
| 4,246,027 | 1/1981 | Watanabe et al. | 75/244 |
| 4,266,977 | 5/1981 | Steiger | 501/96 |
| 4,419,130 | 12/1983 | Slaughter | 75/244 |
| 4,492,670 | 1/1985 | Mizrah et al. | 419/9 |
| 4,544,524 | 10/1985 | Mizrah et al. | 419/9 |
| 4,585,618 | 4/1986 | Fresnel et al. | 419/12 |
| 4,595,545 | 6/1986 | Sane | 264/65 |
| 4,599,320 | 7/1986 | Reeve et al. | 501/96 |

FOREIGN PATENT DOCUMENTS 0164830 12/1985 European Pat. Off.
55-89404 7/1980 Japan.

Primary Examiner—Stephen J. Lechert, Jr.
Attorney, Agent, or Firm—John J. Freer

[57] ABSTRACT

A method for manufacturing ceramic/metal or ceramic/ceramic composite articles is disclosed. The articles can be useful for the production of aluminum in fused salt electrolysis cells, as armor plates for the protection against projectiles, cutting tools, or in abrasion resistance applications. The temperature slope of the process if optimized such that one of the reactants in the manufacturing proceeds through peritectic decomposition at a heating rate of low temperature increase for desirably uniform temperature distribution over the reaction mixture. Then the temperature increase is greatly elevated to obtain a reaction sintering condition for avoiding grain growth of undesired reaction products. Elevated temperature reaction sintering conditions can be maintained to decompose undesired components before they are entrapped by the reaction product.

19 Claims, No Drawings

CERAMIC/METAL OR CERAMIC/CERAMIC COMPOSITE ARTICLE

CROSS-REFERENCE TO RELATED APPLICATION

This is a divisional of application Ser. No. 945,116, now U.S. Pat. No. 4,961,902, filed Jan. 6, 1987, which in turn is a continuation-in-part of application Ser. No. 825,402, filed Feb. 3, 1986, now abandoned.

BACKGROUND ART

There has been proposed the manufacture of composite articles comprising a boride of a first metal selected from the metals of Group IVb, Vb or VIb of the periodic table and a metallic phase constituted by a second metal. The manufacture can be by reaction sintering of a particulate mixture of precursors comprising said first metal or its hydride and a boride of said second metal.

U.S. Pat. No. 4,514,628 discloses a reaction sintered composite cermet material for use in aluminum production cells. The described material may comprise, e.g., $TiB_2$ as the ceramic phase and aluminum as the metallic phase, produced by reaction sintering a precursor mixture of $TiH_2$ and $AlB_2$.

The kind of material disclosed in the above patent is reported to be wettable by molten aluminum and is therefore favorably usable in electrolytic aluminum production cells, where it may replace conventional carbon components which are not wettable by molten aluminum. This will permit a decrease in the anode-cathode distance due to the reduction of the depth of the electrowon aluminum for example in a drained cathode cell as described in U.S. Pat. No. 4,093,425 or in a packed bed cell as described in BP-B-0 033 630.

However, the beneficial effects of a reduction of the anode-cathode distance, resulting in energy savings must not be traded off by the higher cost of the new material. It is therefore a subject of ongoing efforts to decrease the production cost of this new type of proposed material.

An important factor for the price of these ceramic-/metal composites is the duration of the heat cycle, i.e., the time required for the heating of the precursor material until completion of the reaction. Efforts have been made to substantially decrease this duration; however, such efforts were impaired by the formation of undesired reaction products during the sintering reaction.

It is another aspect of the prior art open for improvements that only relatively small shapes can be formed during one individual sintering process. Several of these small elements had to be assembled and, e.g., reaction bonded using a technique such as described in U.S. patent application Ser. No. 620,034, to form an article of the desired size. This drawback is due to the limited admissible volume of the reaction mixture producing exothermic heat during the sintering reaction. When the volume of the reaction mixture was too high, too much heat was produced leading to unacceptable defects in the microstructure of the reaction product. Such defects may be a very coarse grain structure, as well as including cracks, non-uniform distribution of the ceramic phase within the metal phase and loss of metal phase. Such microstructural defects represent sites for mechanical failure in service.

SUMMARY OF THE INVENTION

The present invention provides a method of manufacturing ceramic/metal or ceramic/ceramic composite articles by reaction sintering, to produce, e.g., current collector bar tips for use in aluminum production cells or armor plates, the composition of which is essentially free of undesired reaction products. There is now allowed the production of articles of substantially increased dimensions in one operation which obviates the production of several individual units necessitating assembly and bonding thereof.

Articles produced have a microstructure which results in improved mechanical properties. The interconnected grains of the ceramic phase are smaller than the particle size of the reactants. The materials can furthermore be useful in cutting tools or components for abrasion resistance applications.

The present invention is based in part on the discovery that the formation of undesired reaction products may be desirably suppressed by careful reaction and heat control. The present invention provides a method of manufacturing a composite article as described hereinbefore, comprising the steps of: first providing a mixture of solid, particulate reactants in finely divided form; then heating said mixture up to a first temperature that is below peritectic decomposition temperature, at a moderate rate of increasing temperature. This is followed by reducing the moderate rate of increasing temperature and continuing heating above such first temperature, but below peritectic decomposition temperature, at a lowest rate of increasing temperature then maintaining the lowest rate of increasing temperature at least substantially through peritectic decomposition of the second metal reactant. After that, the method continues by greatly elevating the rate of temperature increase following such lowest rate to a most substantial rate of increasing temperature; maintaining the most substantial rate of increasing temperature to attain a maximum reaction sintering temperature; and cooling the resulting reaction product resulting from the maximum reaction sintering temperature.

In another aspect the invention is directed to a ceramic-metal composite article prepared by the invention method and having a microstructure comprising interconnected ceramic grains of particle size smaller than the particle size of reactants. In yet another invention aspect the ceramic grains are in a matrix of second metal. In another aspect, the invention is directed to a ceramic-metal or ceramic-ceramic composite article having a composition varying over its cross section.

In one particular aspect, the method according to the invention is of specific advantage for the production of $TiB_2/Al$ composite materials. Thus although a great variety of reactions are contemplated in the method, a product of particular interest is the $TiB_2/Al$ ceramic-/metal composite. A reaction for preparing such product will often be referred to hereinafter for convenience in referencing various aspects of the invention. It is usually referred to as the "illustrative" reaction and is as follows:

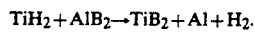

This illustrative reaction can also be useful for reference to various terms employed hereinafter. The $TiH_2$ is representative of a "first metal compound" and the Ti is the "first metal". The $AlB_2$ represents the "second metal compound" and the Al is the "second metal".

When present as $AlB_2$ or the like, such substance is the "second metal boride" or "boride reactant".

The first metal compound and the second metal compound together are the "reactants". They may be present with additional materials, e.g., diluents, as will be discussed more fully hereinbelow. The reactants, whether present by themselves or with additional materials, are in combination often referred to, as the "reaction mixture" or the "starting materials".

During processing, at least some second metal compound decomposes. This is the "peritectic decomposition". As the processing continues following peritectic decomposition, there is involved an elevated temperature "reaction sintering". The whole procedure of peritectic decomposition and reaction sintering for convenience is often referred to as a "hot pressing" process, which will be discussed more fully hereinbelow.

The $TiB_2$ or equivalent produced by the illustrative reaction is the "ceramic" product. The product Al or equivalent is the product of the "second metal". Together they form the "reaction product" or "final product". Reaction sintering at the elevated temperature finishes the formation of the final product. Also during reaction sintering, the ceramic product is bound together into the microstructure of interconnected ceramic grains. cl DESCRIPTION OF THE PREFERRED EMBODIMENTS Numerous other reaction schemes, in addition to the above-noted illustrative reaction, may be presented as useful in the method of the present invention and as embodying the general scope of the invention. For brevity, a few additional representative schemes are the following:

$$ZrH_2 + AlB_2 \rightarrow ZrB_2 + Al + H_2$$

$$Ta + AlB_2 \rightarrow TaB_2 + Al$$

$$NbH_2 + AlB_2 \rightarrow NbB_2 + Al$$

$$TiH_2 + 2Co_2B \rightarrow TiB_2 + 4Co + H_2$$

$$TiN + AlB_2 \rightarrow TiB_2 + AlN.$$

For the present invention the second metal compound decomposition will involve some peritectic decomposition. The resulting second metal compound may be one or more of elemental metal, e.g., Al, or ceramic, e.g., AlN. In all of the foregoing reaction schemes using $AlB_2$, the $AlB_2$ can be expected to pass through a peritectic decomposition. It will be understood however that some second metal reactants may also be present which melt or react. Thus along with $AlB_2$ there can be present some $AlB_{12}$ which might react, e.g., with titanium, rather than proceeding through a peritectic decomposition. Also, where second metal reactants are shown in a reaction scheme and these reactants melt or react, there will thus need to be present some additional second metal reactants which proceed through a peritectic decomposition. For example, $AlB_2$ may be added to the reactants. Furthermore, it is always contemplated that a second metal reactant decomposing by peritectic decomposition will provide the major amount, i.e., greater than 50 mole percent, of the second metal compounds.

As will be noted by reference to the above reaction schemes, other starting materials will include a first metal as the elemental metal or a metal compound and the compound may often be a metal hydride. The hydride as opposed to the elemental metal, can provide a material of desirable reactivity, typically free from oxidic surface layers. The hydrogen in the hydride can be evolved at rather low temperatures so that the reaction mixture will comprise first metal in particulate form as the peritectic decomposition stage is reached. It is contemplated that the first metal will always be a metal of the Group IVb, Vb, or VIb of the Periodic Table, or mixtures of such metals. Most always the first metal will thus be titanium, zirconium, hafnium, vanadium, niobium, tantalum, chromium, molybdenum, tungsten or mixtures thereof including intermetallic mixtures. Where a ceramic/metal composite will be produced the first metal is advantageously present in hydride form for enhanced reactivity. The hydride of particular interest for the first metal compound is titanium hydride.

For the second metal compound there will usually be discussed herein the use of the boride compound. This second metal compound must include substance subject to peritectic decomposition, usually a boride compound. The compound may be a mixture, e.g., of $AlB_2$ and $AlB_{12}$, so long as one will proceed through peritectic decomposition. Useful second metal compounds most always as borides, can include compounds wherein the metals are nickel, chromium, iron, and cobalt as well as mixtures including such metals. Usually the second metal compound will be an aluminum compound and preferably will comprise $AlB_2$.

As noted in the illustrative reaction one mole of $TiH_2$ can be used with one mole of $AlB_2$ to prepare product $TiB_2$ and Al on a 1:1 molar basis. On this basis the final product will contain on the order of about 70 weight percent of $TiB_2$. But for these reactions where a ceramic product and a metal are produced, various proportions of ceramic and metal may be present in the final product. One manner of varying proportions, which manner is useful for preparing ceramic-rich product, is to use some $AlB_{12}$ to replace a portion of the $AlB_2$. As $AlB_2$ is replaced by $AlB_{12}$, for example in a molar proportion of these ingredients approaching on the order of about 3:2, a final product can be produced wherein the $TiB_2$ can approach 90 weight percent of the product. Thus with the illustrative reaction, and at least substantially ignoring the effects of further substances that will be discussed below, but keeping in mind replacing some $AlB_2$ with $AlB_{12}$, the final product will most always contain approximately 70-90 weight percent $TiB_2$ and a balance of Al.

But additional substances in the reaction mixture can also be employed to affect final product proportions. Thus aluminum metal, the use of which is discussed hereinafter, could be present in the illustrative reaction mixture to provide a more metal-rich final product than the 1:1 molar ratio product. For ceramic-rich product, diluent $TiB_2$ could be employed with the reactants. When considering such additional substances as well as the reactants, the final product should contain from 5 to 95 weight percent of the ceramic product, and thus from 95 to 5 weight percent of the second metal. Less than about 5 weight percent of the ceramic product can be insufficient for providing ceramic component benefit in the final product. Greater than about 95 weight percent can lead to undesirably brittle products Advantageously for best freedom from brittleness coupled with desirable ceramic benefit for these materials of ceramic product and a metal, the final product will contain from about 50 to about 90 weight percent ceramic product and a balance of second metal.

As mentioned hereinabove, further substances may be present in the starting materials. A most typical additional substance is a second metal in elemental form. The presence of such second metal in elemental form can be present in substantial amount, e.g., supply 30 to 40 weight percent or more of the second metal in the reaction product. Since the reaction mixture can tolerate elemental second metal it will be understood that impure starting materials may be used, e.g., a second metal boride containing on the order of 1-2 weight percent of free second metal in elemental form as an "impurity". It is however preferred for best characteristics of the final product that purified starting materials be used. For the illustrative reaction, any added second metal is preferably elemental aluminum.

As mentioned hereinabove, a further additive to the starting materials can be a second metal compound, such as a second metal boride, that melts or reacts rather than passing through a peritectic decomposition. Aluminum dodecaboride is such a compound which will proceed by reaction, as opposed to peritectic decomposition. Preferably for a product that is stronger and tougher, these compounds collectively that do not go through peritectic decomposition will; nevertheless form less than 50 mole percent of the second metal compound. Where a second metal compound that is not a peritectic decomposition compound is deliberately added, the molar ratio of the peritectic decomposition compound, e.g., $AlB_2$, to such other compound. e.g., $AlB_{12}$, will preferably be on the order of 3:2 or more, such as 3:1. The molar ratio of 3:2 or more will provide products of most desirable strength and toughness.

The variety of ingredients present in the starting materials may be tailored to the needs of the final product. As an example, in the production of armor plate, it may be desirable to provide a composite material having a gradient in the final product composition along its cross section. This may be obtained by using a mixture of $AlB_2$ and $AlB_{12}$ in the starting mixture and varying the ratio across the reaction mixture gradient. Using $AlB_2$ alone in the starting mixture will yield a $TiB_2$ Al molar ratio of 1:1. On the other hand, a more equal molar proportion of $AlB_2$ to $AlB_{12}$, e.g., 0.6 mole $AlB_2$ with 0.4 mole $AlB_{12}$ reacted with 3 moles of Ti, will create in the final product a 3:1 molar ratio for the TiB :Al.2 Thus where these substances are mixed in a graded proportion through the reaction mixture, the final product will also exhibit a constituency gradient. The high ratio, e.g., a 3:1 molar ratio, and thus a more dense material, can be present at one portion of the final product, and provide product characteristics such as hardness against projectile penetration. The low ratio portion of the final product may have greater deformability. This variation of the $TiB_2$:Al ratio along the cross section may also be of advantage for aluminum collector bar tips. The portion of higher $TiB_2$ content will be used in contact with the molten aluminum and the portion with the higher aluminum content may be welded to the current collector bar.

This variation may also be useful to produce a gradient of substances across the section of the final product where a variety of compounds, even of the same metal, can be selected. Thus a layer of Ti plus CoB might be selected, while using an adjacent layer of Ti with $Co_3B$ which, furthermore, might be present in connection with a layer of Ti with $Co_2B$. It is moreover contemplated that the metals themselves might be varied. Thus a product cross section might be achieved from adjacent layers of Ti with $Co_3B$, then Ti plus $AlB_2$ and a final layer of Ti together with FeB.

It is to be further understood that the reaction mixture may also contain other additional materials including diluents. Such a diluent, or inert filler, might find use for enhancing controlled heat dissipation during peritectic decomposition or reaction sintering. Suitable diluents that can be used include the ceramic product. Additional inert materials useful in the nature of fillers are fibrous substances including whiskers. By being inert, it is meant that the material does not participate in a reaction either during peritectic decomposition or reaction sintering. Fibers may be used for providing increased strength and toughness to the final product. Serviceable fibers can have length dimension on the order of 50 microns, or less, up to 200 microns, or more. They can typically have fiber diameters of 10 microns or less to as much as 20 microns or more. Although the use of a variety of fibrous materials in contemplated, e.g., fibers of silicon carbide, graphite fibers, metal fibers and boron fibers, it is preferred for enhanced final product strength, as well as fiber inertness, that the fibers used are alumina fibers.

Other than the size for the fibers and other inerts, e.g., diluents, the reactants in the starting mixture should be very finely divided particulates, e.g., powders. For desirable reactant mixing, the reactants have particle size of less than about 100 microns, and preferably for best mixing are yet more finely divided, e.g., have particle size smaller than about 40 microns in their largest dimension. This will be sufficient to promote the formation of small sized grains in the final product. Usually, the reactants will be of a particle size such that all to virtually all of the particles are within the range from about one to about 80 microns. It will thus be appreciated that extremely finely divided reactants are not critical. A preponderance of particulate reactants having particle size on the order of sub-micron or less, need not be present to provide a final product having desirable small grain structure.

All starting materials are then most typically well mixed to provide a uniform intermixture of materials. Any usual method for providing such a mixture may be used including wet milling. The milling may proceed in a suitable solvent, e.g., a halogenated hydrocarbon, and the resulting milled mixture dried. Additionally, the mixture may be formed and shaped before further processing. The usual techniques employed for such shaping are suitable. These techniques include cold pressing, slip casting, injection molding, or other forming technique used prior to further processing to provide some initial "green strength" for the starting mixture. Also included in the initial processing before the hot pressing, there can be used a preheat, or calcining operation. This will most always be useful where a first metal hydride is present in the starting mixture, although such may also be employed before further heating where any volatile substances might be released at preheat temperatures. This preheating or calcining will proceed at a moderate temperature, e.g., 500°-700° C. for $TiH_2$, usually under vacuum for hydrogen removal. Where calcining yields an agglomerated mixture, the mixture can be subsequently de-agglomerated, as by milling. The material thus prepared is then ready for hot pressing, it being understood however that hot isostatic pressing may also be useful for the present invention.

Any hot pressing equipment that can provide the elevated temperature and pressure is contemplated as useful. Usually the material will be loaded in a mold having an annular die and equipped with an upper or lower plunger, or with both. Graphite molds have been found to be especially serviceable. The loaded mold can be placed in a furnace equipped for vacuum or inert gas feed and capable of providing the required elevated temperatures. The material loaded to the mold may be at room temperature, or the material may be at a more elevated temperature such as from a preheating or calcining. For best influencing the microstructure of the final product, this material then is heated at a moderate rate of increasing temperature that is above 10° C. per minute. This rate is continued up to a first temperature that is about 50° to 600° C. lower than the peritectic decomposition temperature. A temperature increase of less than 10° C. per minute can be inefficient. So preferably for better efficiency, such moderately elevating temperature rise is at least about 15° C. per minute and may often be more, e.g., 30° C. To avoid local overheating, such increase however will not generally exceed above about 100° C. per minute.

As such processing is then approaching the first temperature that is on the order of about 50° to 600° C. lower than the peritectic decomposition temperature, the temperature increase is substantially slowed to one that is the lowest rate of increasing temperature and is less than 10° C. per minute. An increase of 10° C. or more at this stage might lead to deleterious local overheating in the reaction mixture. For most desirable elimination of local overheating this rate advantageously does not exceed about 8° C. per minute. Most always, this lowest temperature increase will be at a rate less than about 5° C. per minute, e.g., within the range of between about 0.1 and about 5° C. per minute. An increase of less than about 0.1° C. per minute can be inefficient. Since the initial moderate rate of increasing temperature may generally be on the order of 15°-30° C. per minute and this is reduced to a lowest rate often on the order of 1°-8° C., the ratio of the temperature rate decrease can typically be from 2:1 to approximately 15:1.

As will be understood, the peritectic decomposition of the second metal compound is a sluggish decomposition providing a "fluid" temperature range than can often vary over a range of 100° C. or even more. Thus for the illustrative reaction where aluminum diboride is decomposing, the peritectic decomposition may be proceeding through a temperature range on the order of 960°-1050° C. or more, e.g., 1100° C. From this it can be appreciated that selecting a temperature below such peritectic decomposition temperature where the temperature increase is reduced, and thus the heating rate can be expected to be reduced, is subject to a greater degree of latitude than would be the case if the peritectic decomposition was sharply defined. Moreover, where the elevating temperature rate is reduced at a point 50°-600° C. lower than the peritectic decomposition, this further adds to the degree of latitude for the point where such heating rate will be reduced.

It is to be understood that this lowest rate of increasing temperature may be varied such that for example at its initiation, an increase on the order of about 4°-7° C. per minute may be used. This can then be gradually reduced as the peritectic decomposition range is more closely approached. The heating can proceed through the decomposition range in a most reduced mode, such as on the order or about 0.5°-2° C. per minute. During this most reduced mode, e.g., as the peritectic decomposition is taking place, it may be necessary to withdraw heat to avoid local overheating of the mixture and thereby to enhance production of very fine grained product.

In the last step of the hot pressing, the peritectic decomposition is followed by a jump in the heating rate to establish a most substantial rate of increasing temperature to above 20° C. per minute for proceeding with the reaction sintering. Preferably, for best efficiency as well as reduction of deleterious impurities in the final product, such increase is at least about 30° C. per minute and may be as great as 200° C. per minute. A heating rate of greater than 200° C. per minute can be uneconomical. For a best impurity-free final product, as well as for processing efficiency, this last and most substantial temperature increase will be within the range of from about 50° C. to about 150° C. per minute. Owing to the predecessor moderate rate of increasing temperature being on the order of, for example, 5° C. per minute, and the jump to the most substantial rate providing a rate of typically 25° C. to 150° C., the ratio of this temperature rate increase can often be from 5:1 to as much as 30:1 or more.

This most substantial increase will be continued for a time sufficient to provide a final reaction sintering temperature maximum advantageously not in excess of the melting point of the first metal under the conditions of the processing. For the illustrative reaction, such temperature should not increase substantially beyond about 1670° C., the melting point for titanium. Usually for the illustrative reaction, such maximum temperature will be within the range of from about 1300° C. to about 1700° C.

When a maximum temperature has been attained, this is generally maintained to provide a "heat soak" for the final stage of the reaction sintering. More typically this heat soak for the illustrative reaction will be maintained at a temperature within the range from about 1300° C. to about 1600° C. The final rapid temperature increase, as well as the elevated temperature heat soak, can be most beneficial for providing a final product of most desirable density and interconnected microstructure.

For the illustrative reaction, during peritectic decomposition, the AlB2 decomposes to form a substantial amount of liquid aluminum with a small amount of boron dissolved therein. The elemental Ti will react with the boron dissolved in the liquid aluminum to form TiB. A particulate residual of this peritectic decomposition is AlB$_{12}$. The formation of large grains of unreacted AlB$_{12}$ can be undesirable. Initially, unreacted AlB$_{12}$ depletes the available boron present for the overall reaction. Moreover, it may be present as a most deleterious impurity, impairing desirable characteristics in the final product. For example, if the product is used in aluminum electrowinning, the AlB$_{12}$ can react with molten aluminum, leading to degradation of the product. Although not wanting to be bound to any particular theory, TiB$_2$ may form if the elemental titanium and the solid particles of AlB$_{12}$ are in intimate contact. It will also be understood that during peritectic decomposition and reaction sintering, various intermediates may be formed and subsequently decompose. All the while the ceramic product, i.e., the TiB$_2$, can be slowly forming. Thus, as peritectic decomposition proceeds, a material such a TiAl$_3$ may form. This material can be expected to be produced where elemental Ti will react with the liquid aluminum phase provided by the AlB$_2$ decomposition. However, after the peritectic decomposition and as the temperature increases beyond about 1300°–1400° C., this substituent should decompose. Thus the product can be expected to be free from such substance. Despite such complexities, final products can be prepared by the method of the present invention having very low or no concentration of undesired reaction products such as of the $AlB_{12}$, or of the intermetallic compounds as represented by TiB and Al/Ti.

It is contemplated that the hot pressing processing will always be carried out under elevated pressure. This will be at least in part an elevated die pressure as it is advantageous, such as for removal of any by-product volatile materials, that the zone around the die be at reduced atmospheric pressure. The elevated die pressure, typically on the order to 50 to 500 atmospheres for the illustrative reaction, can assist in obtaining a final product having enhanced density. It is also believed that elevated pressure will provide for a more desirable product uniformity, as well as provide for temperature uniformity during processing. For the atmosphere around the die, a simple subatmospheric pressure will be suitable, with a pressure on the order of 0.001 Torr to 0.00002 Torr typically being employed.

The final product will have a microstructure comprising interconnected ceramic grains. The grains will have size of less than 1 micron and more typically less than about 0.5 micron. These interconnected ceramic grains yield enhanced mechanical properties for the final product. The interconnected ceramic grains can also provide for enhanced final product utility such as utility in contact with molten aluminum. Where the final product is a cermet, these grains will be present in a matrix of elemental second metal. The composition of the metal matrix will not only depend upon the second metal of the second metal reactant but also upon any additional elemental metal which may be present in the starting mixture.

The following examples show ways in which the invention has been practiced. However these examples are not to be construed as limiting the invention.

EXAMPLE 1

Equimolar quantities of $TiH_2$ (Alfa-Ventron lot #11 GLB-193) having a particle size of less than 5 microns and $AlB_2$ (H. C. Starck lot #S-5152) having a particle size of less than 40 microns were milled in 1,1,1 trichloroethane, dried, and calcined at 630° C. under vacuum to remove hydrogen. The calcined powder was then milled to de-agglomerate the blend.

A 250 gram portion of this blend was loaded into a graphite die. The die was placed in the load train of a vacuum hot-press. The furnace program was controlled by computer using a tungsten-rhenium thermocouple located approximately 6 mm (¼ inch) from the bottom of the powder charge within the bottom plunger.

Once a reduced pressure of 0.0005 Torr around the die was established the powder was heated under a constant pressure of approximately 125 atm. (1750 psi) at a rate of 30° C./min. to a temperature of 500° C. From that point to 700° C. the rate was 3.5° C./min. At this point the heating rate was reduced to control the sensitive peritectic decomposition. The powder was heated at 2° C./min. until the $AlB_2$ decomposition was observed at 1060° C. The temperature was then manually increased at a rate of approximately 90° C./min. until a maximum temperature of 1500° C. was achieved. The pressure on the die was also increased to approximately 140 atm. (2000 psi) and the die was held at such elevated pressure and temperature conditions for 30 minutes. The product was then cooled at furnace rate to room temperature.

The product thus obtained had an Archimedes density of 3.77 $g/cm^3$. The product contained less than 0.5 weight percent of $AlB_{12}$ and the $AlB_2$ had grain size smaller than 10, typically 5 microns.

Separately, a comparative sample of the same molar proportions of $TiH_2$ and $AlB_2$ was prepared and processed. But in the hot pressing the final heat increase, from 1150° C. to 1400° C. was at only 2° C./min. This comparative sample had a density of only 3.7, contained 1–2 weight percent $AlB_{12}$ and had enlarged $AlB_{12}$ grains of up to 70 microns.

EXAMPLE 2

Equimolar quantities of the $TiH_2$ and the $AlB_2$ of Example 1 were initially processed in the manner of Example 1, i.e., they were milled in solvent, dried, calcined at elevated temperature and under vacuum to remove hydrogen and then remilled to de-agglomerate the blend. A 300 gram charge of the resulting calcined and de-agglomerated blend was placed into a graphite die and the die was placed in a furnace as described in Example 1.

Upon establishing a reduced pressure furnace atmosphere of 0.0005 Torr, the heating and die pressure were then increased. The pressure was increased to approximately 125 atmospheres (1000 psi) and held. The temperature of the sample was increased at a rate of 15° C. per minute to a temperature of 500° C. The temperature was maintained ar 500° C. for 15 minutes and then the rate adjusted to 5° C. per minute until a temperature of 800° C. was reached. After 15 minutes at 800° C. the temperature rate was decreased to 1.5° C. per minute until 920° C. was achieved and then after maintenance at 920° C. for 10 minutes the rate was elevated at 1° C. per minute to 1100° C. for reduced heating through the peritectic decomposition. At the 1100° C. temperature level, the rate was quickly increased to 80° C. per minute until a temperature of 1400° C. was reached. During the rapid temperature increase, the die pressure was increased to about 140 atm. (2000 psi). At this maximum pressure and temperature, the heat soak lasted 0.5 hour.

Upon cooling and removal from the die, the finished product sample was found to have a density of 4.07 $g/cm^3$. Moreover, the sample was found to have a bend strength, as determined by four point beam bending of 589 Megapascals (MPa). This is significantly greater than the tensile strength of aluminum, which is 120 MPa, and is supportive of the assertion of interconnected $TiB_2$ grains. In addition, the sample was found to have a modulus, as determined by ultrasonic pulse echo, of 449 Gigapascals (GPa) and a hardness (Vickers) of 1436 Newtons/milimeters$^2$ ($N/mm^2$). This data is presented in tabular form hereinbelow for this "invention" sample.

Separately, a comparative sample of the same amount, and in the same molar proportion for reactants, was treated in the manner as hereinabove described for sample preparation and for initial hot pressing. The temperature and pressure increase for this comparative sample was initiated in the manner of the above-described invention sample. However, as hot pressing proceeded, no rapid temperature elevation was provided for this sample after the peritectic decomposition. Rather, from the 920° C. level up to the 1400° C. level the temperature was elevated at a constant 1° C. per minute. The comparative sample was held at the 1400° C. soak for 30 minutes as was the invention sample. Upon cooling and sample removal, it was tested and characterized in the manner for the invention sample. These results for both samples are presented in the table hereinbelow.

TABLE

| Sample | Density g/cm$^3$ | Hardness N/mm$^2$ | Modulus GPa | Strength MPa |
|---|---|---|---|---|
| Comparative | 3.81 | 971 | 353 | 398 |
| Invention | 4.07 | 1436 | 449 | 589 |

EXAMPLE 3

For test sample preparation, there was initially provided 2 moles of $TiH_2$, together with sufficient $AlB_{12}$ along with the $AlB_2$, for achieving a $TiB_2/Al$ product molar ratio of 2:1. A 300 gram sample was prepared from the starting materials as described in Example 1 and processed in the manner of Example 1. The sample was placed in a die and the die placed in a furnace as discussed in Example 1. Elevated pressure and temperature conditions were initiated in the manner of Example 2. The initial temperature elevation was as described in Example 2. At the 800° C. temperature level, after a hold for 15 minutes, the temperature was gradually increased at 3° C. per minute through the peritectic decomposition, to a temperature of 1200° C. At this point, the rate of temperature increase was quickly elevated to an 80° C. per minute increase and the die pressure was elevated and maintained at 140 atmospheres (2000 psi). The achieved temperature maximum was 1600° C., that was maintained for a 30 minute heat soak.

Upon cooling, the sample was analyzed and tested in the manner of the samples of Example 2. From the results of such testing, the sample was found to have a density of 4.19 g/cm$^3$, a hardness of 1792 N/mm$^2$, a modulus of 488 GPa, and a strength of 490 MPa.

We claim:

1. A composition having a microstructure comprising interconnected grains, of a grain size less than about one micron, the grains being of a ceramic product of a first metal selected from one of more Group IVb, Vb or VIb metals of the periodic table, said interconnected grains being in a ceramic or metal product of a second metal selected from the group consisting of aluminum, nickel, chromium, iron, cobalt and mixture thereof, wherein the composition is produced by the method comprising:
   providing a mixture of solid, particulate reactants in finely divided form including a second metal reactant that in the manufacture goes through peritectic decomposition;
   heating said mixture up to a first temperature that is below peritectic decomposition temperature, at a moderate rate of increasing temperature;
   reducing said moderate rate of increasing temperature and continuing heating above said first temperature, but below peritectic decomposition temperature, at a lowest rate of increasing temperature of less than 10° C. per minute;
   maintaining said lowest rate of increasing temperature of less than 10° C. per minute at least substantially through peritectic decomposition of said second metal reactant;
   greatly elevating the rate of temperature increase following said lowest rate to a most substantial rate of increasing temperature of above 20° C. per minute;
   maintaining said most substantial rate of increasing temperature of above 20° C. per minute to attain a maximum reaction sintering temperature; and
   cooling the resulting reaction product resulting from said maximum reaction sintering temperature.

2. The composition of claim 1, wherein said microstructure comprises interconnected grains of a boride of said first metal with said interconnected grains being in a matrix of said second metal which is in elemental form.

3. The composition of claim 2, wherein said boride is of a first metal selected from one or more or titanium, zirconium, hafnium, vanadium, niobium, tantalum, chromium, molybdenum and tungsten.

4. The composition of claim 1, wherein said first metal ceramic product provides 70–90 weight percent of said composition and said second metal is the 10–30 weight percent balance.

5. The composition of claim 1, wherein said first metal ceramic product provides 5–95 weight percent of said composition and said second metal is the 95–5 weight percent balance.

6. The composition of claim 1, wherein said interconnected grains have size on the order of about 0.5 micron.

7. The composition of claim 1, wherein said composition has density of least about 99 percent of theoretical density.

8. The composition of claim 1, wherein said first metal ceramic product is titanium diboride, said second metal is aluminum and said composition contains less than about one weight percent of $AlB_{12}$.

9. A ceramic-metal composite article varying over its cross section by providing at least two different second metal borides are reactants at least one of which decomposes through peritectic decomposition, the composite article having a microstructure comprising interconnected grains of a grain size less than about 1 micron, the grains being of a first metal boride product with the first metal being selected from one or more Group IVb, Vb or VIb metals of the periodic table, and with the interconnected boride grains being in a matrix of a second metal selected from the group consisting of aluminum, nickel, chromium, iron, cobalt and mixtures thereof, wherein the composition is produced by the method comprising:
   providing a mixture of solid, particulate reactants in finely divided form including a second metal reactant that in the manufacture goes through peritectic decomposition;
   heating said mixture up to a first temperature that is below peritectic decomposition temperature, at a moderate rate of increasing temperature;
   reducing said moderate rate of increasing temperature and continuing heating above said first temperature, but below peritectic decomposition temperature, at a lowest rate of increasing temperature of less than 10° C. per minute;
   maintaining said lowest rate of increasing temperature of less than 10° C. per minute at least substantially through peritectic decomposition of said second metal reactant;
   greatly elevating the rate of temperature increase following said lowest rate to a most substantial rate of increasing temperature of above 20° C. per minute;

maintaining said most substantial rate of increasing temperature of above 20° C. per minute to attain a maximum reaction sintering temperature; and cooling the resulting reaction product resulting from said maximum reaction sintering temperature.

10. The composite article of claim 9, wherein said boride reactants comprise at least two different borides of the same metal.

11. The composite article of claim 9, wherein said boride reactants comprise borides of at least two different metals.

12. The composite article of claim 1 as a current collector bar tip for an aluminum production cell.

13. The composite article of claim 1 as an armor plate for protection against projectiles.

14. The composite article of claim 1 as a cutting tool.

15. The composite article of claim 1 for abrasion resistance application.

16. The composition of claim 2, wherein said mixture of solid, particulate reactants comprises $AlB_2$ with one or more of $TiH_2$ or Ti, and optionally including $AlB_{12}$, the resulting reaction product being an intimate mixture of $TiB_2$ and aluminum, the $TiB_2$ being present as interconnected grains of less than one micrometer, the aluminum essentially filling the pores between said grains.

17. The composition of claim 16, wherein there is provided a mixture of solid, particulate reactants comprising $AlB_2$, $AlB_{12}$ and $TiH_2$ or Ti, the ratio of $AlB_2$ to $AlB_{12}$ being variable over the cross-section of the starting mixture and the ratio of $TiB_2$:Al varying over the cross-section of the reacting product.

18. The composition of claim 9, wherein said mixture of solid, particulate reactants comprises $AlB_2$ with one or more of $TiH_2$ or Ti, and optionally including $AlB_{12}$, the resulting reaction product being an intimate mixture of $TiB_2$ and aluminum, the $TiB_2$ being present as interconnected grains of less than one micrometer, the aluminum essentially filling the pores between said grains.

19. The composition of claim 18, wherein there is provided a mixture of solid, particulate reactants comprising $AlB_2$, $AlB_{12}$ and $TiH_2$ or Ti, the ratio of $AlB_2$ to $AlB_{12}$ being variable over the cross-section of the starting mixture and the ratio of $TiB_2$:Al varying over the cross-section of the reaction product.

* * * * *